INVENTOR.
ELMER O. WHITE
BY Woodling Krost
Grange and Rust
attys.

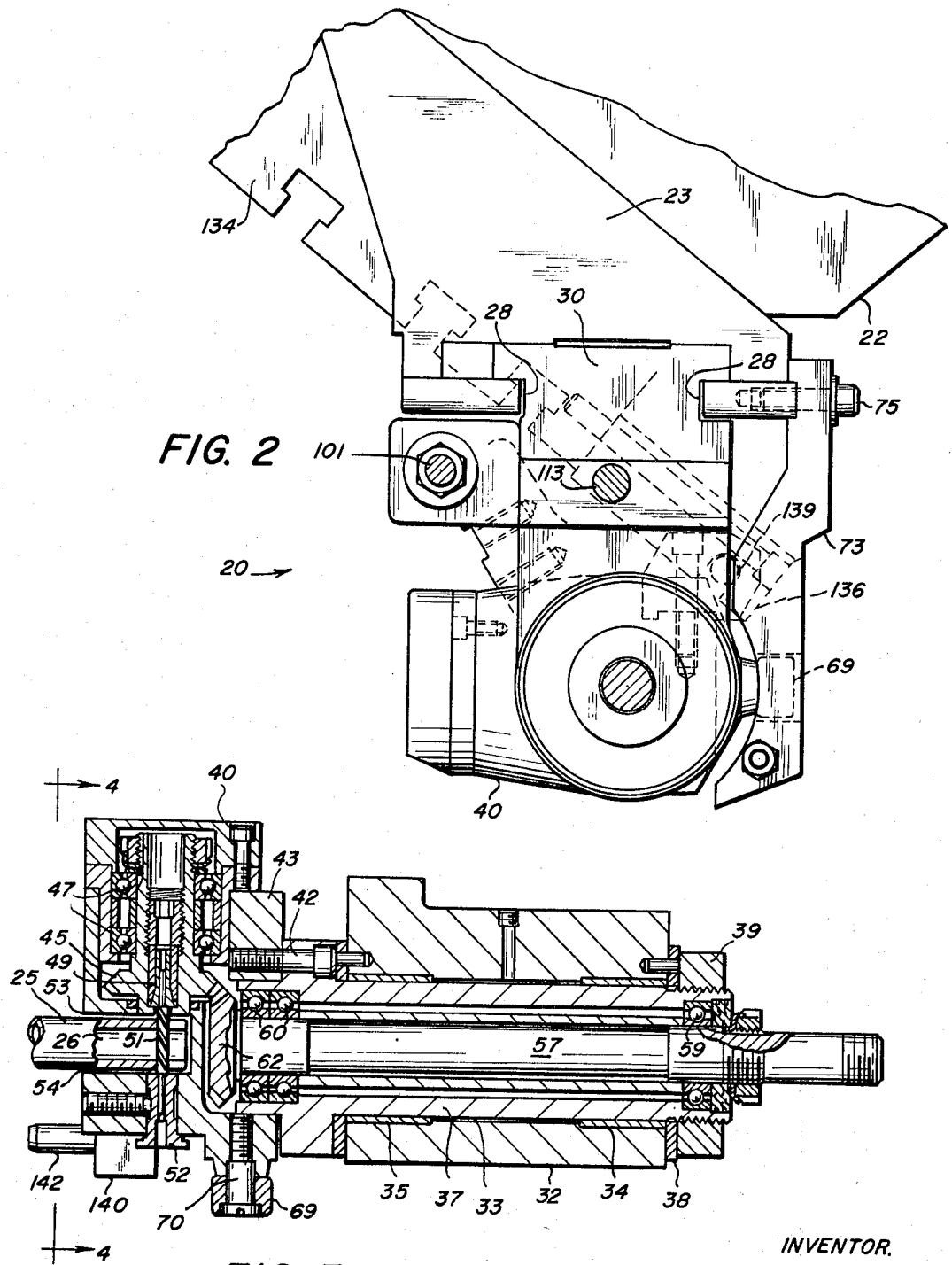

March 5, 1968  E. O. WHITE  3,371,581
MILLING APPARATUS

Filed Feb. 9, 1966  4 Sheets-Sheet 3

INVENTOR.
ELMER O. WHITE
BY Woodling, Krost,
Granger and Rust,
attys.

March 5, 1968 E. O. WHITE 3,371,581
MILLING APPARATUS
Filed Feb. 9, 1966 4 Sheets-Sheet 4

INVENTOR.
ELMER O. WHITE
BY Woodling, Krost,
Granger and Rust,
attys.

United States Patent Office 3,371,581
Patented Mar. 5, 1968

3,371,581
MILLING APPARATUS
Elmer O. White, Euclid, Ohio, assignor to The National Acme Company, a corporation of Ohio
Filed Feb. 9, 1966, Ser. No. 526,204
11 Claims. (Cl. 90—15)

The present invention relates in general to milling apparatus and more specifically to such apparatus to produce a slot of a given path such as a bayonet slot in a workpiece.

This apparatus includes an arcuately movable milling head carried by support means with first motive power means moving the support means longitudinally back and forth relative to a workpiece held in a given position. The milling head carries a milling cutter which is rotatable about an axis generally normal to the axis of the workpiece, and the milling head is arcuate moved back and forth between angular limits by second motive power means. The apparatus also comprises fixed cam surface means which are engaged by a cam follower fixed to the milling head which accurately controls the longitudinal and arcuate movements of the milling head which movements are induced by the first and second motive power means.

The invention may be embodied in an apparatus for milling an opening in a workpiece which includes workholder means for holding the workpiece as well as a support member which is mounted for movement between first and second longitudinal positions and a head is carried by the support member and has tool mounting means for rotatively mounting a milling cutter in a position with its axis generally normal to the axis of the workpiece. The embodiment also includes cam means which act on the head for accurately guiding the same through its longitudinal movement and means are provided for relatively arcuately moving the workholder and the head about an axis generally normal to the axis of the milling cutter.

An object of the present invention is to provide an apparatus and method for conveniently producing a bayonet locking slot in a workpiece.

Another object of the present invention is to provide an apparatus and method for providing matching slots 180 degrees apart in the wall of an annular workpiece having a bore or recess therein.

Another object of the present invention is to provide an apparatus for producing matching bayonet slots in an annular workpiece and located 180 degrees apart which slots may have a locking portion and wherein the circumferentially extending portion may if desired be provided with a lead angle.

Other objects and a fuller understanding of this invention may be had by referring to the following description and claims, taken in conjunction with the accompanying drawings, in which:

FIGURE 2 is a view, on a slightly larger scale, taken generally along the line 2—2 of FIGURE 1;

FIGURE 3 is a view, on a slightly larger scale, taken generally along the line 3—3 of FIGURE 1;

Figure 1:
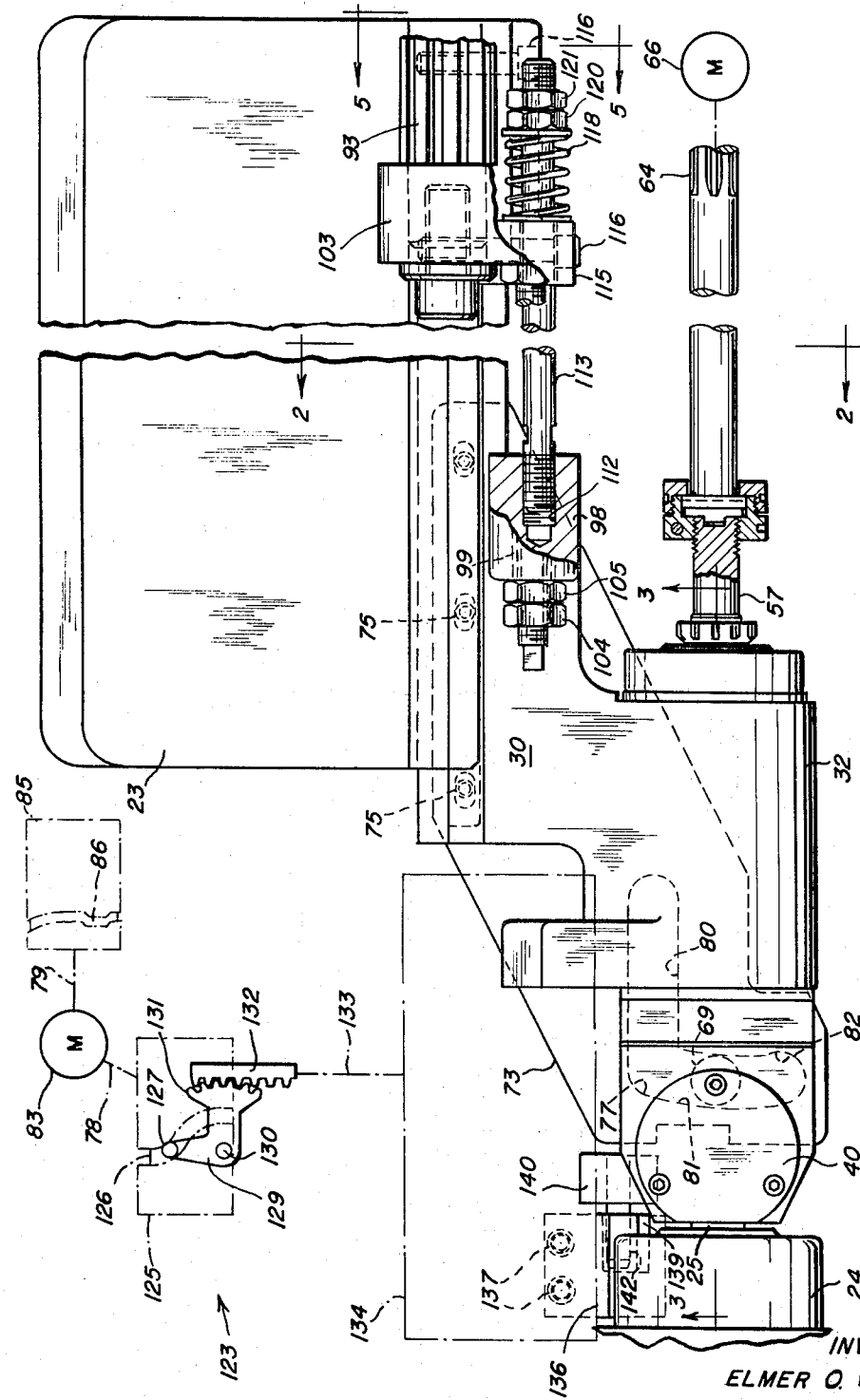
FIGURE 1 is an elevational view of the milling apparatus of the present invention.
Figure 4:
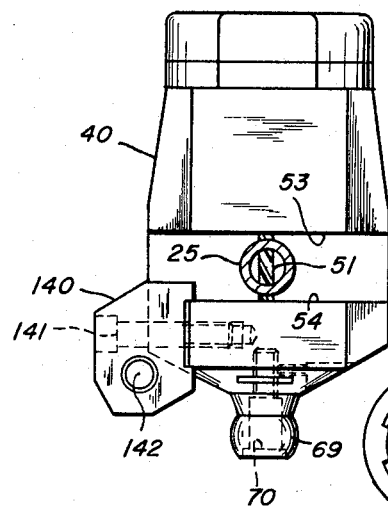
FIGURE 4 is a view taken generally along the line 4—4 of FIGURE 3.
Figure 5:
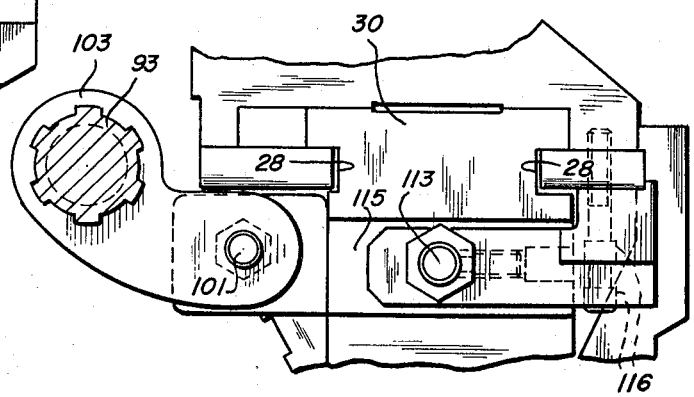
FIGURE 5 is a view taken generally along the line 5—5 of FIGURE 1.

The figures of the drawing illustrate the milling attachment or apparatus of the present invention which has been indicated generally by the reference numeral 20. This milling apparatus is adapted for convenient use with lathe type machines which are provided with a work spindle and is more particularly adapted for use with what is known in the art as multiple spindle bar machines. These machines are known and appreciated by those skilled in the art. In light of this, the preferred embodiment of the milling apparatus of the present invention will be described in conjunction with such a multiple spindle machine and it will be understood by those skilled in the art that this apparatus is used in a given position of such machine for example as herein described the attachment or apparatus is located at the fourth position of an eight spindle bar machine.

The machine with which the present invention is associated is provided with an upper frame member sometimes referred to herein as a mounting frame 22 (FIGURE 2) which includes member 23 as well as a spindle or workholder means 24 (FIGURE 1) which rotatively carries a workpiece 25 which in this particular instance is provided with a bore or recess 26. The mounting frame 22 is provided with wall means which define a guideway 28 which extends in a generally longitudinal direction which direction is generally parallel with the axis of the spindle 24. Located in the guideway 28 is a slidable support member 30, also sometimes referred to as a die slide, and this slidable support member 30 is movable back and forth between first and second positions. The first position of the support member 30 is that in which the device is shown in FIGURE 1 or in other words in the position where the apparatus is located closest to the workpiece and the second position of the support member 30 is the position of the milling apparatus in its longitudinal position farthest from the workpiece 25.

A housing 32 is connected to the support member 30 and may be said to form a part of the slidable support member and this housing is provided with a cylindrical bore 33 best seen in FIGURE 3 which extends completely therethrough. Bearings 34 and 35 are located in the bore 33 and serve to rotatably mount a sleeve 37 therein at least for arcuate movement, the right end of which as seen in FIGURE 3 is maintained in axial position relative to the housing by means of a nut 39 threadably secured to the sleeve. This nut rotatively bears against a washer 38 bearing against the housing and the opposite end of the sleeve 37 extends from the left end of the bore 33. A rotatable milling head 40 is located at the left end of the housing 32 and is fixedly secured to the left end of sleeve 37 by means of bolts 42 extending into member 43. A first bevel gear 45 is rotatably mounted in the milling head 40 by means of bearings 47 and this bevel gear rotates about an axis which is generally normal to the axis of the sleeve 37 as well as the axis of the workpiece 25 and spindle 24. A collet type chuck 49 is coaxially carried by the first bevel gear 45 for rotation therewith. This chuck 49 is adapted to receive the first end of a milling cutter 51 and the other end of the milling cutter is rotatably piloted in a tool bushing 52. It will be noted that the milling head 40 in the area of the milling cutter 51 is provided with a recessed part defined by spaced walls 53 and 54 which enables the head to be axially moved toward the workpiece and enables the milling cutter 51 to find proper access to the workpiece. Since the milling head is fixedly secured to the sleeve 37 the rotation of one is transmitted to the other and the head is arcuately movable between first and second positions. The position of the head as seen in FIGURE 1 is substantially intermediate its first and second positions with the first position being its extreme downward position as seen in this view and its second position being its extreme upward position as seen in this view.

A drive shaft 57 extends axially through the sleeve 37 and is mounted for rotation relative to the sleeve on bearings 59 and 60. A second bevel gear 62 is secured to the left end of the drive shaft 57 as seen in FIGURE 3 and this bevel gear is in meshing engagement with bevel gear 45 and as a result rotation of the drive shaft 57 is transmitted to the milling cutter 51 so as to provide the desired rotation for the machining operation performed on the workpiece. The right end of the drive shaft as best seen in FIGURE 1 is provided with a splined portion 64 which is connected to an electric motor 66 which has not been shown in detail since it is of a conventional construction. The splined portion 64 is for the purpose of permitting the drive shaft 57 to move axially relative to the gear which rotatively drives the same while still rotatively driving the bevel gears.

A cam follower roll 69 is secured to the rotatable milling head 40 by means of a pivot member 70 and the cam follower 69 is adapted to cooperate with a first or template cam 73 which is fixedly secured to the mounting frame 23 by bolts 75. This cam 73 is provided with a cam surface 77 which has first and second portions 80 and 81 which extend at generally right angles to each other and a third portion 82 which is connected to the second portion and extends at generally a right angle thereto. The cam surface is generally enclosed, however, from a functioning standpoint the surface 77 is of primary importance. The function of the cam surface 77 in cooperation with the cam follower 69 is to accurately control the position of the milling head 40 in all of its movements which are longitudinal and arcuate in nature with the longitudinal movement being induced from one motive power source and the rotational movement being induced from another motive power source which power sources will be more fully described hereinafter. Both motive power sources referred to are synchronized and are actuated usually by one main drive motor 83 which may be referred to as a main drive mechanism. This synchronization is indicated in FIGURE 1 by the dot-dash lines 78 and 79.

Figure 6:
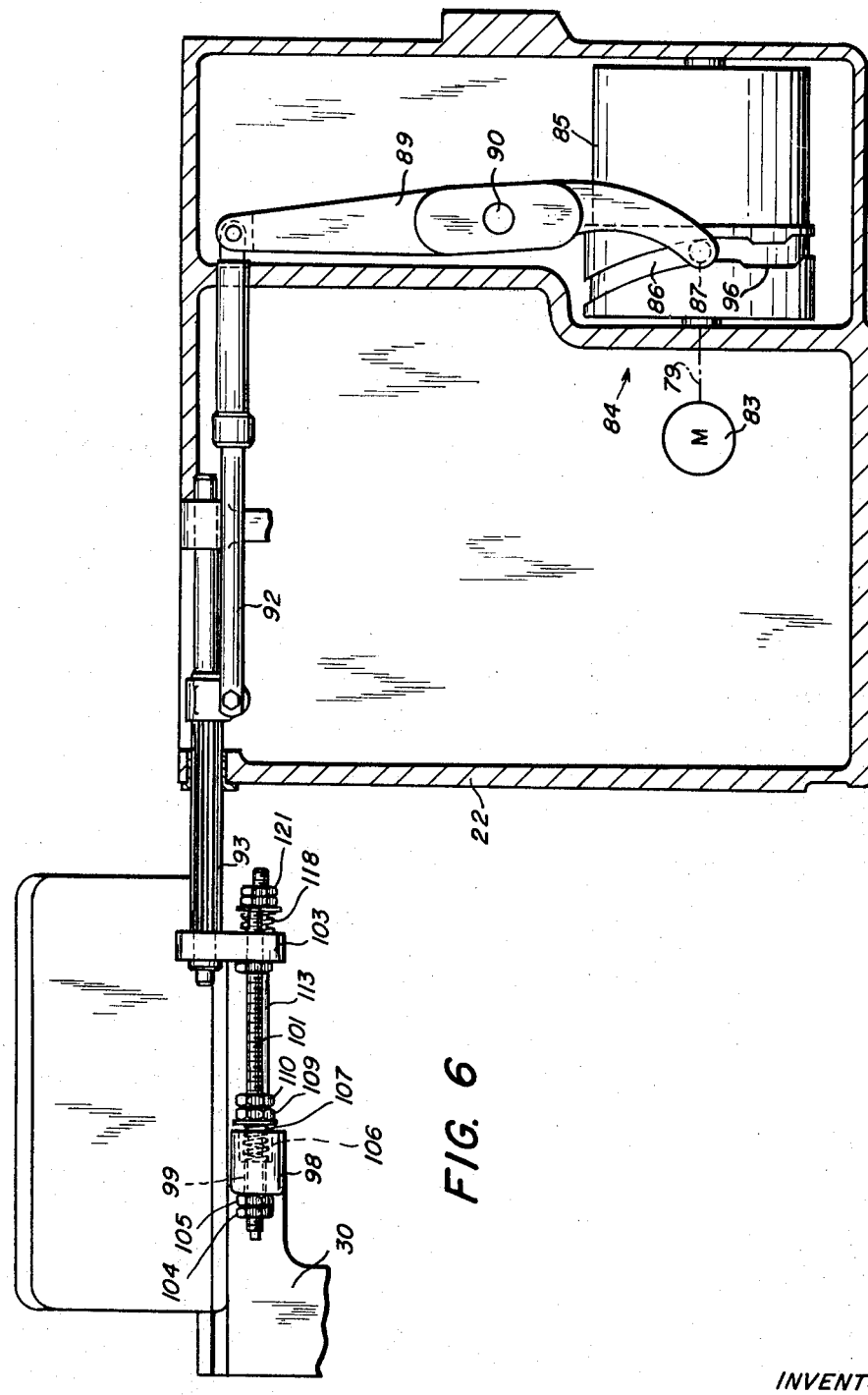
FIGURE 6 is an elevational view showing the mechanism utilized for driving the milling apparatus of the present invention in its back and forth longitudinal movement.

The back and forth longitudinal movement of the slidable support member and housing 32 as well as the milling head 40 which is carried thereby is imparted by what has been referred to herein generally as longtudinal cam drive means 84 which are best seen in FIGURE 6. The longitudinal cam drive means as disclosed herein includes a rotatable cam drum 85 journalled in frame 22 and which carries a cam surface 86 which in turn receives a cam follower 87. The cam follower 87 is connected to one end of a lever 89 pivoted at 90 and the other end of the lever is connected through linkage means to the slidable support member 30. This linkage means includes first and second rods 92 and 93. It will be appreciated by those skilled in the art that as the cam drum 85 rotates the cam follower 87 causes the lever to pivot back and forth about its pivoted mounting 90 causing the back and forth movement. The cam surface 86 is provided with a relieved or recessed portion 96 for a purpose which will be described hereinafter. It will be noted that the slidable support member 30 is provided with a boss 98 having an opening 99 extending completely therethrough. Rod 93 is connected to another rod member 101 by being threaded into a collar 103 as shown and the left end of rod member 101 extends completely through the opening 99 and is provided with nuts 104 and 105 threadably received on the left end thereof. The boss 98 is provided with a counter bore 106 and a spring 107 is received in this counter bore 106 and surrounds the rod member. The spring is retained in the counter bore by means of nuts 109 and 110. It will thus be seen that as the slidable support member 30 is moved forward toward the spindle 24 of the machine from its second to its first position, the movement is transmitted through the spring 107 which causes the spring to be compressed for a purpose which will be described hereinafter. The spring effects a lost motion connection between support member 30 and cam drive means 84 otherwise referred to as first motive power means.

The boss 98 is provided with another threaded opening 112 as seen in FIGURE 1 which receives the left end of a stop rod 113. The right end of the stop rod extends through an opening in a stop block 115 which is fixedly secured to the mounting frame 23 by way of bolts 116. A spring 118 surrounds the right end of the stop rod 113 and extends between nuts 120 and 121 which are threadably connected to the stop rod and the stop block 115. It will be appreciated from reviewing this structure that as the slidable support member 30 moves toward the left (as viewed in FIGURE 1) just prior to reaching its first position the spring 118 is compressed tending to bias or pull the support member back. Movement of the slidable support member to the right from the position in which it is shown in FIGURE 1 is permitted because the spring 118 and nuts 120 and 121 simply move away from the stop block 115. The function performed by the spring 118 will be described in slightly more detail hereinafter.

Rotational cam drive means 123 (FIGURE 1) are provided for imparting the rotational movement to the milling head. The rotational cam drive means, at times referred to as second motive power means, includes a cam drum 125 journalled in frame 22 and having a cam surface 126 which in turn receives and controls the position of a cam follower 127. The cam follower is connected to an L-shaped lever 129 pivoted at 130 and gear teeth 131 on the end of the L-shaped lever 129 are in meshing engagement with the teeth on a rack member 132 which is mechanically connected by linkage 133 to a sliding member 134 which moves in a straight line direction and is commonly referred to in this particular art as the top slide of the multiple spindle machine. A rotation operation block 136 is bolted to the sliding member 134 by bolts 137 and is provided with an opening 139. A drive pin block 140 is bolted to the milling head 40 by bolts 141 and includes a drive pin 142 which is adapted to be received in the opening 139 of the block 136 upon arrival of the slidable support member 30 and milling head 40 at its first longitudinal position. Downward movement of the top slide or sliding member 134 from the position shown in FIGURE 1 will of course cause rotation of the milling head.

Figure 7:
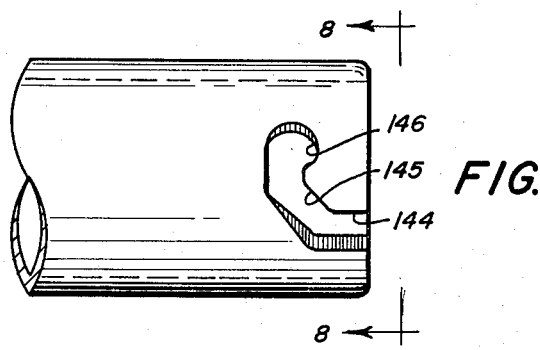
FIGURE 7 is an elevational view of a slot produced by the apparatus and method of the present invention; and, FIGURE 8 is a view taken generally along the line 8—8 of FIGURE 7 and shows the matching bayonet slots located 180 degrees from each other.
Figure 8:
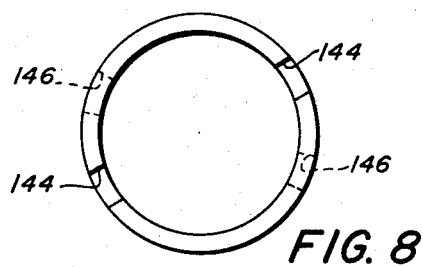

The operation of the milling attachment or apparatus will be hereinafter described and produces what is commonly referred to in the art as a bayonet slot having a locking surface. A view of the finished bayonet slot has been shown in FIGURES 7 and 8 of the drawings and it will be noted that the apparatus herein disclosed produces matching bayonet slots in the workpiece which are located 180 degrees from each other. With the workpiece 25 held in a fixed position in a stopped spindle 24 of the lathe type machine, the slidable support member 30 along with the milling head carried by the housing 32, is moved in a longitudinal direction from its second position at the extreme right through the urging action initiated by rotation of the cam drum 85. This causes pivoting of the lever 89 and in view of its connection through the rods 92, 93 and 101 to support member 30, the milling head is moved. This urging is transmitted by way of the spring 107 and causes the cam follower 69 carried by the milling head to travel in the first portion 80 of the cam surface 77. During this phase of the movement the milling cutter 51 has been rotating about its axis by way of the drive shaft 57 which is driven from motor 66. This produces the axial part 144 of the bayonet slots which are seen in FIGURES 7 and 8. The spring 107 provides what may be referred to as a slight lost motion between the longitudinal cam drive means 84 and the slidable support member 30 and milling head 40. The longitudinal cam drive means 84 and the rotational cam drive means 123 are mechanically connected together in the machine which the present milling apparatus is to be used with and this synchronization of these two drive means has been illustrated by motor 83 and connections 78 and 79. As the slidable support member 30 reaches its first position or that in which it is shown in FIGURE 1, the drive pin 142 on the milling head is caused to travel into the opening 139 and thereafter because of the synchronization between the longitudinal cam drive means 84 and the rotational cam drive means 123, means 123 is actuated causing the slide member 134 to move downwardly (as seen in FIGURE 1) thereby causing the milling head to travel through its rotational or arcuate movement, which rotational movement is guided by means of the cam follower 69 traveling in the second portion 81 of the cam surface 77. During this portion of the travel the lost motion action of the spring 107 maintains the cam follower 69 under forward pressure in engagement with the surface 77. The rotation of the milling head proceeds (producing the rotational part 145 of the slot) until the cam follower 69 reaches the junction between the second portion 81 and the third portion 82 of the cam surface 77 and at this time the cam follower 87 of the longitudinal cam drive means 84 becomes located or positioned at the relieved portion 96 of the cam surface 86. When this occurs the force built up by the compression of spring 118 causes the slidable support member 30 and milling head 40 to move to the right as seen in FIGURE 1 to an extent determined by the third portion 82 of the cam surface 77. This produces the locking portion 146 of the bayonet slot shown in FIGURE 7. It will also be noted that the second portion 81 of the template cam 73 is provided with a slight lead which produces a slight lead on the bayonet slot shown in the finished device. It will be readily appreciated that by the use of different template cams, a bayonet slot can be provided with no lead or with leads different from that shown in this specific embodiment.

After the cam follower has traversed the third portion 82 of the cam surface the longitudinal cam drive means 84 and the rotational cam drive means 123 reverse their sequence and guide the milling cutter in a reverse direction back through the path it had previously traveled thereby removing the milling cutter from the axial extent of the workpiece and the spindle 24 is then indexed from the position shown in these figures to have other machining operations performed thereon and another spindle carrying another workpiece is indexed into position to have the same operation performed thereon.

The forward pressure exerted on the slidable support member 30 and the milling head by way of the compression of spring 107 at the beginning of the cam follower 69 traversing the second portion 81 of the cam surface 77 serves to compensate for any variation between the rotational lead angle on the template cam and forward build-up pressure on the cam surface 86 of the longitudinal cam drive means. In the set-up of the apparatus the cam surface 86 is so set that cam follower roll 69 bears against cam surface 81 (or to the left as seen in FIGURE 1) under compression of spring 107 which is stronger than spring 118.

It will therefore be seen that the present invention has provided a novel apparatus and means for producing a slot in a workpiece and more particularly matching slots in a hollow or recessed workpiece with the matching slots being spaced 180 degrees from each other. The present invention has also provided the novel cooperative constructional arrangement necessary to adapt the present apparatus to a lathe type machine as for example the multiple spindle machine which has been disclosed and described herein.

Although this invention has been described in its preferred form with a certain degree of particularity, it is understood that the present disclosure of the preferred form has been made only by way of example and that numerous changes in the details of construction and the combination and arrangement of parts may be resorted to without departing from the spirit and the scope of the invention as hereinafter claimed.

What is claimed is:

1. Apparatus for milling an opening in a workpiece including in combination, workholder means for holding a workpiece along an axis, a support member, means mounting said support member for movement between first and second positions in a generally longitudinal direction parallel to said axis toward and away from the workpiece, a head carried by said support member and movable therewith, tool mounting means carried by said head for rotatably mounting a milling cutter in a position with its axis generally normal to the axis of the workholder, cam means acting on said head for moving the same through said longitudinal movement between said first and second positions, and means for relatively arcuately moving said workholder and said head about said workholder axis.

2. Apparatus for milling an opening in a workpiece including in combination a support member, means mounting said support member for movement between first and second positions in a generally longitudinal direction toward and away from the workpiece, a head carried by said support member, and mounted for arcuate movement between first and second positions about an axis generally parallel to the axis of the workpiece, tool mounting means carried by said head for rotatably mounting a milling cutter in a position with its axis generally normal to the axis of the workpiece, a cam follower carried by said head, a cam member, said cam member having a cam surface for engagement with said cam follower, said cam surface having first and second portions extending in directions generally transverse to each other, a main drive mechanism, means operatively connecting said main drive mechanism to said support member for moving same between said first and second longitudinal positions with said cam follower in engagement with said first portion of said cam surface and operatively connecting said main drive mechanism to said head for moving same between said first and second arcuate positions with said cam follower in engagement with said second portion of said cam surface.

3. Apparatus as claimed in claim 2 wherein said main drive mechanism includes first motive power means connected to said support member for moving same between said first and second longitudinal positions with said cam follower in engagement with said first portion of said cam surface and second motive power means connected to said head for moving same between said first and second arcuate positions in said first position of said support member with said cam follower in engagement with said second portion of said cam surface.

4. Apparatus as claimed in claim 2 wherein lost motion means are interposed between said first motive power means and its connection to said support member to compensate for inaccuracies in the distance said first motive power means moves said cam follower in engagement with said first portion of said cam surface before said second motive power means is actuated to move said cam follower in engagement with said second portion of said cam surface.

5. Apparatus as claimed in claim 4 wherein said lost motion means includes a spring member.

6. Apparatus as claimed in claim 2 wherein biasing means are provided to exert a force on said support member upon arrival of same at its first position tending to move same toward its second position against the urging of said first motive power means, said cam surface being provided with a third portion located at a point remote from said first portion and connected to said second portion, and means relieving the urging of said first motive power means in the direction of moving said support member from said second to said first position upon arrival of said head at its first rotative position whereby said biasing means urges said support member in the direction of its second position and said cam follower engages said third portion of said cam surface.

7. Apparatus as claimed in claim 6 wherein said biasing means is effected by way of a spring member.

8. Apparatus as claimed in claim 2 wherein said first motive power means comprises a second cam and second cam follower connected to said support member by way of mechanical linkage and said second motive power means comprises a third cam and a third cam follower connected by mechanical means to said head for moving said head between its first and second positions.

9. The method of making matching bayonet slots located circumferentially 180 degrees from each other in the end portion of an annular workpiece having a bore therein comprising the steps of moving an annular workpiece and a milling cutter which rotates about an axis generally normal to the axis of the workpiece, relatively toward each other in the direction of the workpiece axis to produce longitudinal axial slots in the workpiece of a given length and 180 degrees apart, arcuately moving the milling cutter and workpiece relative to each other about an axis generally parallel to the workpiece axis to produce circumferential slots of a given length and 180 degrees apart, and thereafter retracing the aforementioned movements to remove the milling cutter from the axial extent of the workpiece.

10. The method as claimed in claim 9 wherein the milling cutter and workpiece are moved relatively away from each other in the direction of the workpiece axis a given distance after the circumferential slots are produced.

11. An apparatus as claimed in claim 1 wherein said cam means includes first, second and third cams, said first cam cooperating with said head to accurately guide same throughout its movement, said second cam acting through a first spring to provide said longitudinal movement of said support member toward said workholder, said third cam acting on said head for arcuate movement thereof, a second spring stressed during a portion of the longitudinal movement of said support member toward said workholder, said first spring normally being stressed a greater extent than said second spring to have the greater force acting on said support member, and a relieved portion in said second cam to relieve the stress on said first spring so that said second spring has the greater stress to move the support member longitudinally in the opposite direction away from the workholder.

No references cited.

FRANCIS S. HUSAR, *Primary Examiner.*